Patented Dec. 9, 1941

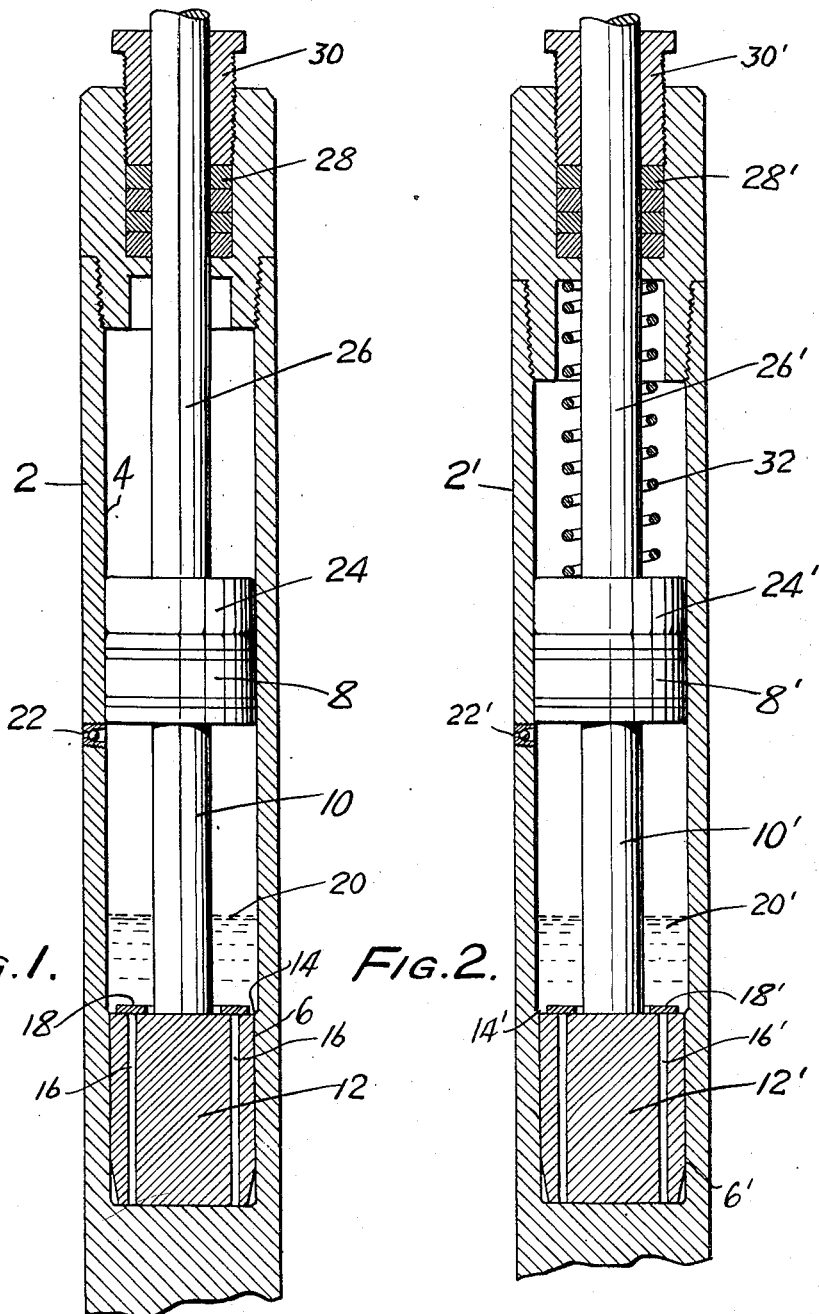

2,265,431

UNITED STATES PATENT OFFICE 2,265,431

HYDRAULIC JAR

Ralph L. Kerr, Oklahoma City, Okla., assignor of one-half to J. Eldon Peek, Oklahoma City, Okla.

Application January 11, 1939, Serial No. 250,270

4 Claims. (Cl. 255—27)

This invention relates to a jar for use in well drilling operations designed to impart severe jarring action to a lost tool or the like which it is desired to dislodge from a bore hole.

It frequently happens that tools or other devices are lost in a bore hole and after they are engaged by the usual fishing tools that they cannot be dislodged from the formation by the usual pulling methods. The caved-in materials surrounding the lost tool are frequently compacted to such extent that circulation of mud cannot be effected to wash them away and release the tool. Accordingly, the dislodging of the tool can only be effected by the use of a so-called jar, which by applying a severe jarring action, generates vibrations in the tool tending to free it. The ordinary type of jarring tool consists of an outside case slidably fitted over an anvil. The outer case is initially located by means of engaging devices between it and the anvil in a relaitvely low position with respect to the anvil so that a pull may be exerted on a drill pipe to which the case is secured until a severe strain is effected, whereupon the strain is suddenly released by turning the case, with the result that the drill pipe snaps upwardly causing the case to strike a shoulder on the anvil and exert a hammering action thereon.

Devices of this type have taken various forms, but in general it is required that there be provided between the jar and the surface a string of pipe in order that a twisting action may be secured to effect the release. Additionally, a fault common to all of the jars heretofore provided has been that during the short interval between release and the blow the strain on the fishing tool is released and consequently the fishing tool and the lost tool which it engages may drop downwardly to such extent that the blow is not transmitted to the formations, the energy being dissipated solely in arresting the downward movement of the fishing tool and lost tool which it engages.

The broad objects of the present invention are first to provide a jar which does not require the use of a string of pipe for its operation, since only a pull need be transferred from the surface without any torsional stress, and secondly the provision of a jar so arranged that though a severe jarring action is imparted to the fishing tool, the strain on the fishing tool is not released at the time the blow is given. The various parts are under continuous strain from a time prior to and through the delivery of the blow, and hence a much more effective transmission of the blow is secured to dislodge the lost tool from the formation.

Other objects of the invention, particularly relating to details of construction, will become apparent from the following description, read in conjunction with the accompanying drawing, in which:

Figure 1 is a vertical section through one form of the improved hydraulic jar, this form being particularly adapted for operation through a drill string; and Figure 2 is a similar section, but showing a modification for operation by means of a wire line.

Referring first to the modification of Figure 1, the improved jar comprises a casing 2 which may contain, or which may be connected to, conventional fishing tool elements. Since the fishing portion of the apparatus may take any of the usual conventional forms, it need not be described in detail. It is sufficient to say that it is of the form adapted to engage a lost tool or the like which is to be dislodged from a caved-in formation in a hole.

The housing 2 is provided with a bore indicated at 4 within which slides a piston 8 closely fitting its walls and preferably provided with piston rings or other packing means to confine beneath it air under high compression. The piston 8 is carried by a rod 10 to the lower end of which is secured a piston member 12 arranged to move within a more restricted extension 6 of the cylinder 4. The fit of the piston 12 in the extension 6 of the cylinder is arranged to be a quite close one, whereas the piston 8 has quite considerable clearance with the upper enlarged portions of the cylinder. The junction of the two portions of the cylinder is indicated at 14 in the form of a shoulder which may be engaged by the tapered lower portions of the piston member 12 to center the same in the cylinder extension 6.

The piston member 12 is provided with a plurality of vertical ports 16, adapted to be closed by a ring 18 acting as a check valve preventing the passage of liquid 20 downwardly through the port 16, but permitting its free upward passage.

Communicating with the space under the piston 8 there may be a suitable check valve arrangement indicated at 22, through which air or other gas may be introduced at exeremely high pressure and maintained within the cylinder.

Above the piston 8 there is located a second piston 24 which, however, need not have any gas-tight fit within the cylinder 4. The piston 24 is carried by a rod 26, which passes through suitable packing 28 in the upper portion of the apparatus, this packing being tightened by means of a gland 30. The rod 26 is adapted to be secured to a drill string which is to be used to raise the lost tool through the medium of the fishing tool.

In the operation of the jar of Figure 1 a liquid such as oil, indicated at 20, is located within the cylinder. Some gas, preferably air, is then compressed in the space between this liquid and the piston 8 under very high pressure. This pressure should be of the order of pressures encountered in the bore hole at the depth at which the apparatus is used. Under such circumstances it will be evident that the piston 8 will move to its uppermost position carrying with it the rod 26.

The instrument is now lowered within the bore hole by building up a drill stem attached to the rod 26. When the fishing tool engages the lost tool which is to be removed from the hole, the weight of the drill stem may be permitted to rest on the apparatus, whereupon the piston 24 will be forced downwardly forcing the piston 8 downwardly, and with it the piston 12, which will pass freely into the reduced section of the bore because of the opening of the check valve 18. Such action cocks the apparatus, and it will remain in such condition until it is desired to effect the impact serving to loosen the lost tool.

When it is desired to cause the impact to take place, the drill stem is raised pulling the piston 24 to the top of the cylinder 26. The piston 8 will not follow it immediately because of the limited clearance between the piston 12 and its bore 6, and that piston will move upwardly only at a slow rate, depending upon the leakage of the oil or other liquid past it to the bottom of the cylinder 6. The clearance between this piston and such cylinder may be made to provide any desired rate of rise of the piston. As soon as the piston clears the shoulder 14, however, it may rise with great rapidity under the action of the highly compressed gas below the piston 8, and consequently the piston 8 and its assembly will act as a hammer to be violently driven against the piston 24. During all of this time, of course, an upward stress can be exerted on the fishing tool which will insure that the impact has the greatest possible effect in jarring free from the formation the lost tool. By merely lowering the drill stem so as to cock the apparatus, this action may be repeated any necessary number of times.

In Figure 2 there is disclosed an apparatus almost identical with Figure 1, and in which corresponding parts are designated by the same reference characters primed. This apparatus, however, is of a form adapted to be operated by means of a wire line. Since in such case there will be insufficient weight to cock the apparatus, there is provided a very strong spring 32, which will be strong enough to force the pistons 24' and 8' to their lowermost positions. In causing the jarring action to take place, an upward force is exerted on the wire line, preferably bringing the upper piston 24' into engagement with the shoulder at the upper end of the cylinder. Thereafter, as in the case of the previous modification, the piston 8 will move upwardly slowly until the piston 12' clears the lower restricted portion 6' of the cylinder, whereupon a rapid upward movement will occur to produce the jarring action. The apparatus may be again cocked merely by releasing the wire line to permit the spring 32 to force the piston downwardly.

Instead of using compressed gas beneath the pistons 8 and 8', it will be obvious that a strong spring may be used which would force the piston 8 upwardly, though it would yield in the cocking of the apparatus under the weight of the drill stem in the case of Figure 1, or under the superior force of an upper spring in the case of the modification of Figure 2.

What I claim and desire to protect by Letters Patent is:

1. A jarring device for use in bore holes comprising a member adapted for engagement within the hole and providing a cylinder, a supporting member movable relatively to the first member and having a portion movable in said cylinder, a hammer element comprising a piston located in said cylinder movable relatively to said supporting member, said cylinder having a small bore portion closely fitting said piston and a communicating enlarged bore portion loosely fitting said piston, means for urging said piston from the small bore portion of the cylinder into the large bore portion thereof, and liquid within said cylinder, said portion of the supporting member movable in the cylinder engaging said hammer element to force the piston into the small bore portion to cock the device, and the slow leakage of liquid past said piston in the small bore portion of the cylinder delaying for a substantial period the occurrence of a blow by said hammer until said supporting member disengages said hammer element and may engage and exert a direct upward stress on said first mentioned member.

2. A jarring device for use in bore holes comprising a member adapted for engagement within the hole, a supporting member movable relatively to the first member, a hammer element, means effective upon downward movement of said supporting member relative to the first member to cock said hammer element, said supporting member being movable upwardly relatively to the first member and independently of said hammer element after said cocking action to a position to engage and exert a direct upward stress on the first member, means for urging said hammer element out of cocked position, and means operable first to restrict movements of the hammer element after said upward movement of the supporting member and then, after substantial predetermined time delay following such upward movement of the supporting member and exertion of said direct upward stress of the supporting member on the first member, to effect automatically, and during the continued exertion of said direct upward stress, the delivery of a jarring blow by said hammer element under the action of said urging means.

3. A jarring device for use in bore holes comprising a member adapted for engagement within the hole, a supporting member movable relatively to the first member, a hammer element, means effective upon downward movement of said supporting member relative to the first member to cock said hammer element, said supporting member being movable upwardly relatively to the first member and independently of said hammer element after said cocking action to a position to engage and exert a direct upward stress on the first member, means for urging said hammer element out of cocked position, and means operable first to restrict by restricted hydraulic flow action movements of the hammer element after said upward movement of the supporting member and then, after substantial predetermined time delay following such upward movement of the supporting member and exertion of said direct upward stress of the supporting member on the first member, to effect automatically, and during the continued exertion of said direct upward stress, the delivery of a jarring blow by said hammer element under the action of said urging means.

4. A jarring device for use in bore holes comprising a member adapted for engagement within the hole, a supporting member movable relatively to the first member, a hammer element, means effective upon downward movement of said supporting member relative to the first member to cock said hammer element, said supporting member being movable upwardly relatively to the first member and independently of said hammer element after said cocking action to a position to engage and exert a direct upward stress on the first member, elastic means for urging said hammer element out of cocked position, and means operable first to restrict movements of the hammer element after said upward movement of the supporting member and then, after substantial predetermined time delay following such upward movement of the supporting member and exertion of said direct upward stress of the supporting member on the first member, to effect automatically, and during the continued exertion of said direct upward stress, the delivery of a jarring blow by said hammer element under the action of said urging means.

RALPH L. KERR.